(12) United States Patent
Egloff et al.

(10) Patent No.: US 9,518,659 B2
(45) Date of Patent: Dec. 13, 2016

(54) FLAT GASKET WITH CALENDERED SIEVE LAYER

(75) Inventors: Georg Egloff, Weissenhorn (DE);
Oliver Claus, Laichingen (DE); Hans Waldvogel, Krumbach (DE); Andreas Helfenbein, Markt-Schwaben (DE); Robert Blersch, Baltringen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 548 days.

(21) Appl. No.: 13/261,751

(22) PCT Filed: Apr. 5, 2012

(86) PCT No.: PCT/EP2012/001567
§ 371 (c)(1),
(2), (4) Date: Dec. 5, 2013

(87) PCT Pub. No.: WO2012/136384
PCT Pub. Date: Oct. 11, 2012

(65) Prior Publication Data
US 2014/0090343 A1    Apr. 3, 2014

(30) Foreign Application Priority Data
Apr. 7, 2011 (DE) .................... 20 2011 004 993 U

(51) Int. Cl.
*B01D 39/20* (2006.01)
*B01D 29/00* (2006.01)
(Continued)

(52) U.S. Cl.
CPC ........ *F16J 15/0818* (2013.01); *B01D 39/2027* (2013.01); *B32B 15/02* (2013.01); *F16J 15/064* (2013.01); *F16J 15/0825* (2013.01)

(58) Field of Classification Search
CPC . B01D 39/2027; B01D 29/00; B01D 29/0002; B01D 29/0004; B01D 29/0018; B01D 29/002; B01D 29/01; B01D 29/03; B01D 29/05; B01D 2239/1225; B01D 2239/1233; B01D 2239/1266; B01D 2239/1275; B01D 2239/1291; B01D 39/20; B32B 15/02; B32B 15/04; B32B 15/14; F16J 15/02; F16J 15/0818; F16J 15/0825; F16J 15/0831; F16J 15/085; F16J 15/0868; F16J 15/064; F16J 15/08
(Continued)

(56) References Cited

U.S. PATENT DOCUMENTS 5,680,883 A    10/1997   Gluf, Jr.
6,357,758 B1    3/2002   Zurfluh
(Continued)

FOREIGN PATENT DOCUMENTS

DE    20019040 U1    1/2001
DE    69720312 T2    2/2004
(Continued)

OTHER PUBLICATIONS

Machine-generated English Translation of JP200281307, obtained via the J-Piat Pat (Japan Platform for Patent Information) website (URL: https://www.4j-platpat.inpit.go.jp/eng/tokujitsu/tkbs_en/TKBS_EN_GM101_Top.action).
(Continued)

*Primary Examiner* — Joseph Drodge
(74) *Attorney, Agent, or Firm* — Marshall & Melhorn, LLC

(57) ABSTRACT

The present invention relates to a flat gasket with filter elements. In order to fulfill the increased requirements with respect to cleanliness, there is an increased demand for the
(Continued)

integration of filter elements in flat gaskets. The corresponding filter elements mainly serve for picking of impurities accrued during production as well as other residues circulate via the operational fluids, especially during the initial period of operation of an internal combustion engine or a vehicle.

30 Claims, 6 Drawing Sheets

(51) Int. Cl.
*B32B 15/02* (2006.01)
*F16J 15/08* (2006.01)
*F16J 15/06* (2006.01)

(58) Field of Classification Search
USPC ....... 210/348, 489, 490, 498, 499, 503–508; 277/592–595, 650; 55/487
See application file for complete search history.

(56) References Cited

U.S. PATENT DOCUMENTS

| | | | | |
|---|---|---|---|---|
| 7,309,372 | B2* | 12/2007 | Kahlbaugh | B01D 39/2024 210/508 |
| 8,496,253 | B2* | 7/2013 | Goettler | F16J 15/08 277/593 |
| 2004/0041352 | A1 | 3/2004 | Hohe et al. | |
| 2004/0209065 | A1* | 10/2004 | Kaplo | H05K 9/0015 428/306.6 |
| 2005/0132998 | A1* | 6/2005 | Gorgas | F02F 11/002 123/196 A |
| 2008/0093808 | A1 | 4/2008 | Quick et al. | |
| 2009/0152819 | A1 | 6/2009 | Schneider et al. | |
| 2010/0109256 | A1* | 5/2010 | Goettler | F16J 15/0818 277/592 |
| 2010/0187171 | A1* | 7/2010 | Gupta | D04H 1/42 210/491 |
| 2011/0001295 | A1 | 1/2011 | Egloff et al. | |

FOREIGN PATENT DOCUMENTS

| | | |
|---|---|---|
| DE | 102004034824 A1 | 2/2006 |
| DE | 102007019946 A1 | 10/2008 |
| DE | 202010006768 U1 | 8/2010 |
| EP | 1992847 A1 | 11/2008 |
| JP | H024412 A | 1/1990 |
| JP | H03118814 A | 5/1991 |
| JP | H07031116 A | 1/1995 |
| JP | H09108521 A | 4/1997 |
| JP | H1015321 A | 1/1998 |
| JP | 2000102707 A | 4/2000 |
| JP | 200281307 A | 3/2002 |
| WO | 2008135133 A1 | 11/2008 |

OTHER PUBLICATIONS

Machine-generated English Translation of JP2000102707, obtained via the J-Piat Pat (Japan Platform for Patent Information) website (URL: https://www4.j-platpat.inpit.go.jp/eng/tokujitsu/tkbs_en/ TKBS_EN_GM101_Top.action).
Machine-generated English Translation of JPH03118814, obtained via the J-Piat Pat (Japan Platform for Patent Information) website (URL: https://www4.j-platpat.inpit.go.jp/eng/tokujitsu/tkbs_en/ TKBS_EN_GM101_Top.action).
Machine-generated English Translation of JPH024412, obtained via the J-Piat Pat (Japan Platform for Patent Information) website (URL: https://www4.j-platpat.inpit.go.jp/eng/tokujitsu/tkbs_en/ TKBS_EN_GM101_Top.action).
Machine-generated English Translation of JPH1015321A, obtained via Espacenet Patent Search (URL: http://worldwide.espacenet. com/?locale=en_EP).
Machine-generated English Translation of JPH07031116, obtained via the J-Piat Pat (Japan Platform for Patent Information) website (URL: https://www4.j-platpat.inpit.go.jp/eng/tokujitsu/tkbs_en/ TKBS_EN_GM101_Top.action).
Machine-generated English Translation of JPH09108521, obtained via the J-Piat Pat (Japan Platform for Patent Information) website (URL: https://www4.j-platpat.inpit.go.jp/eng/tokujitsu/tkbs_en/ TKBS_EN_GM101_Top.action).
Chinese Office Action issued Aug. 26, 2014 with English Translation.

\* cited by examiner

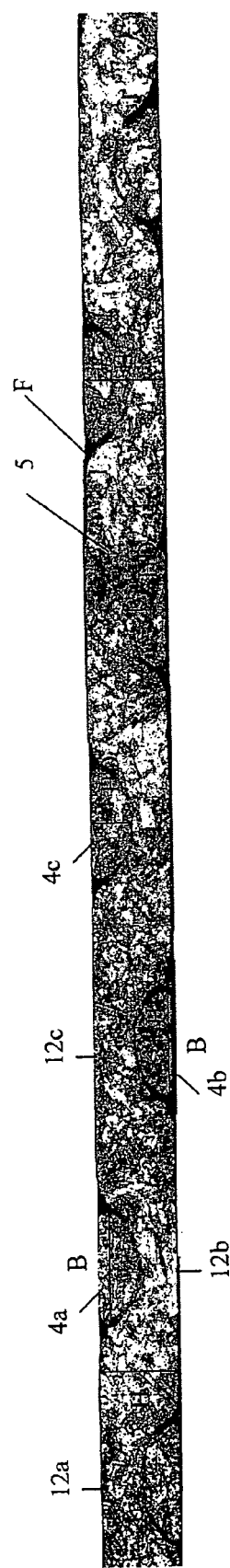

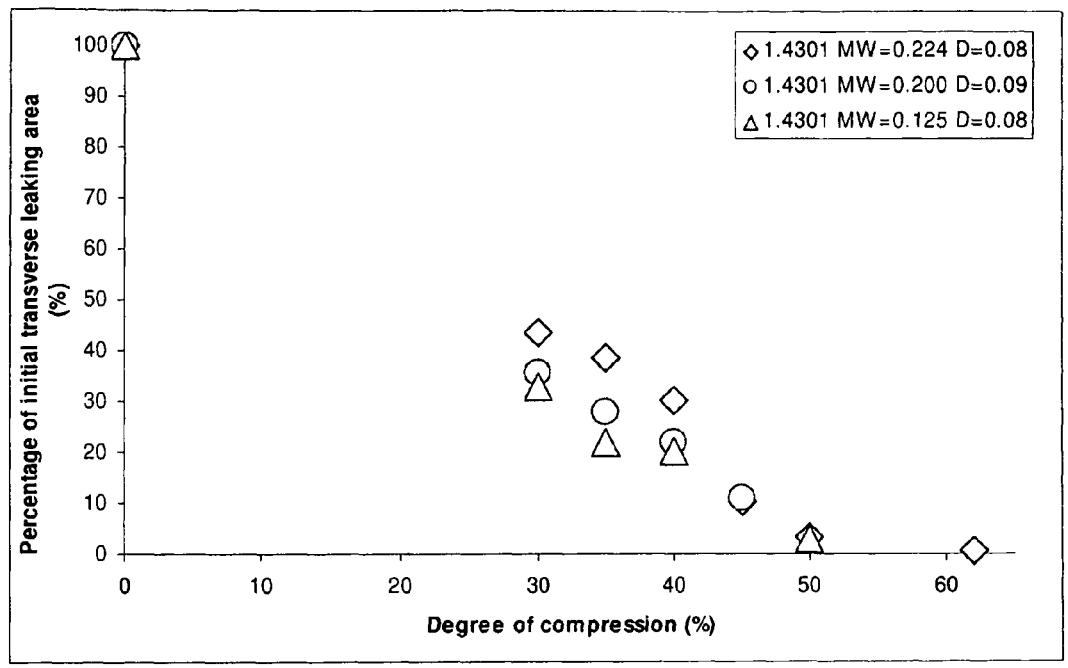
Fig. 7-A
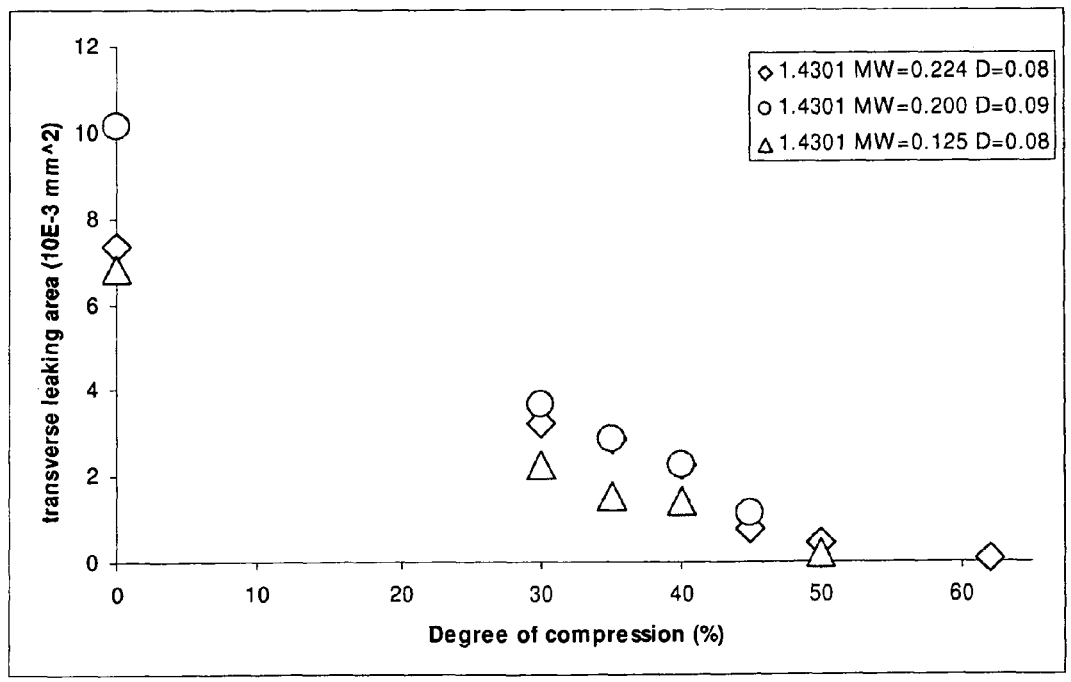
Fig. 7-B

FLAT GASKET WITH CALENDERED SIEVE LAYER

BACKGROUND OF THE INVENTION

The present invention relates to a flat gasket with filter elements.

In order to fulfil the increased requirements with respect to cleanliness, there is an increased demand for the integration of filter elements in flat gaskets. The corresponding filter elements mainly serve for picking of impurities accrued during production as well as other residues circulate via the operational fluids, especially during the initial period of operation of an internal combustion engine or a vehicle.

Such flat gaskets are already known from the state of the art, e.g. from DE 200 19 040 U1 or DE 20 2010 006 768 U1. They are mainly used as gaskets for parts which guide water, air and/or oil. This can be gaskets in transmissions, cylinder head gaskets or other gaskets in internal combustion engines and especially gaskets in the exhaust line of internal combustion engines.

DE 20 2010 006 768 U1 teaches a flat gasket with a metallic mesh material being installed between two metallic layers. The mesh material extends between the metallic layers and also spans the area of the passage openings in the metallic layers. In and for these passage openings, the mesh layer acts as a filter. According to DE 20 2010 006 768 U1, the mesh material is not compressed in these filter areas, while it is compressed in the bridge areas where it is covered by the material of the metallic layers. This compression causes a transverse impermeability of the mesh material in the respective areas, whereas the non-compressed mesh material in the filter areas shows a reduced flow resistance for the fluid which passes through the passage openings in the metallic layers.

It is disadvantageous that the mesh material has to be compressed with a demanding process in the areas to be covered by the metallic layers, namely the sealing areas, while the filter areas have to be protected from any compression. Such a structured and local compression method is demanding and causes considerable cost of production.

BRIEF SUMMARY OF THE INVENTION

It is therefore the object of the present invention to overcome this problem. It is thus the object of the present invention to provide for a metallic flat gasket as well as to its use, which gasket can easily be passed by the fluid in its filter regions, has a high transversal impermeability in the sealing areas and at the same time can be produced with low effort.

This object is solved by the metallic flat gasket according to claim 1. The claims depending on claim 1 represent advantageous embodiments of the invention.

Claim 19 provides for advantageous uses of the metallic flat gasket according to the invention. These are especially given if the gasket is used as a transmission plate or a gasket for a transmission and in general as a gasket for parts which pass water, air, pressurized gas and/or oil, or other gaskets of an internal combustion engine, especially in the exhaust line of an internal combustion engine.

The invention thus provides for a flat gasket which comprises at least two metallic layers, thus two layers comprising a metal sheet or consisting of metal sheet. These metallic layers show passage openings which upon assembly of the gasket layers correspond to each other and are arranged adjacent to each other in a direction perpendicular to the planes of the gasket layers. Adjacent here means that the passage openings can be arranged directly one upon the other or indirectly, thus distanced to each other by at least one intermediate layer. These gaskets allow for the passage of fluids from one side of the passage opening to the opposite one, e.g. of hydraulic oil in a transmission or of air in pneumatic transmission actuator, of exhaust gases in gaskets in the exhaust gas recirculation area or of water in the supply gasket of a water pump. Apart from that, the gasket usually also shows passage openings for fastening means, especially for bolts and/or screws.

In both metallic layers, several passage openings are arranged vicinal to each other in the respective plane of the gasket layer with the respective passage openings in the different layers preferably being flush with each other or at least being continuous in the passage direction. These passage openings may be provided with a filter or may be designed in such a way that they allow for non-filtered passage of media. The present invention relates to a flat gasket with a mesh material which forms the filter element for such passage openings with filter.

Between the two metallic layers, a further, thus a third layer, is arranged according to the invention, which third layer in the area of the passage openings for the passage of fluids does not comprise a passage opening of its own but which spans these passage opening(s). In order to nevertheless allow for the passage of fluids, this third layer is designed as a sieve layer, which comprises a mesh material or consists of mesh material.

The mesh material comprises threads which cross each other while forming crossings. Preferably, the mesh material is a woven mesh material.

According to the invention, the height of the mesh material is reduced both in the filter regions and in the adjacent regions already covered by the metallic layers in such a manner that for all crossing points, the total height of two threads crossing each other in the centre of a crossing point is less than the 1.4 fold, preferably less than 1.2 fold of the height of an individual thread at half the distance between two neighbouring crossing points. In an advantageous embodiment, the entire mesh material of the sieve layer is formed in this way.

This means that the mesh material in the region of the passage openings and in the regions encircling the passage openings is compressed to 70%, preferably to 60%, of its initial thickness or less, with the compression preferably being realized over the complete area of the mesh material. This applies for the cases where the mesh material at least in the centre area between the crossing points of the threads is not compressed meaning that the threads at least in the centre area show their initial thickness. In case the mesh material is compressed to a higher degree, thus with the threads also being compressed in the centre area between the crossing points, the total height of two threads of the mesh at a crossing point equals the height of a thread in the centre area between two neighbouring crossing points.

Advantageously, the compressed mesh material shows a degree of compression of more than 30%, preferably more than 35%, preferably more than 40%, especially preferably more than 45% compared to the non-compressed initial material. For some mesh materials, especially the ones with larger original mesh widths or partitions, even higher degrees of compression are recommended, namely more than 50% or even 55%. These values apply for non-compressed mesh thread with an essentially round cross section, which are usually used for mesh materials.

In an advantageous embodiment, two threads crossing each other at a crossing point as a consequence of the compression show a ratio of their width (extension in the plane of the mesh material and essentially orthogonal to the extension direction of the thread) to their height (extension perpendicular to the plane of the mesh material) of between 1.5 and 4, preferably between 2 and 4, preferably between 2 and 3, further preferably between 2.5 and 3.

In an ordinary mesh material, thus a non-compressed, initial material, it is obvious that there is considerable free interspace in the mesh when considering the mesh material from above or from the bottom side. This interspace provides for the permeability of the mesh material in a direction perpendicular to the plane of the mesh. Within the plane of the crossings, each crossing point of two threads is surrounded by an alternating sequence of four free interspaces and four continuations of the threads crossing each other. In a mesh with a plain weave, each thread rises between a first pair of threads and descends between the next pair which causes that even in a very densely woven material, there is quite some interspace. In an intersection through the mesh, which is taken exactly at half the width of a particular thread, when following this thread along its course through the plurality of crossing threads, the thread is covered by crossing threads only in short sections, namely at the crossing points. Especially in the immediate neighbourhood of a crossing point between a longitudinal and a transversal thread, interspaces are present between these two threads both to the left and to the right side of the transversal thread. These interspaces in the cross-sectional view often have a shape which can be considered approximately triangular. These interspaces allow fluid to pass transversely through the mesh, e.g. along the thread. In the gasket according to the invention, a sufficient transversal impermeability is achieved by a compression of the initial mesh material, thus by a shift of material of the thread mainly from the upper and lower surfaces of the mesh into these interspaces, which results in a reduction of the thickness of the mesh material compared to the initial mesh material. When considering a comparable cross-sectional view through the mesh at half the width of a particular thread, the remaining free areas between this, e.g. transversal thread and the longitudinal threads crossing the former are much smaller compared with the interspaces in the initial material. In the cross-section which is taken at half the width of the thread, a remaining free area—thus a continuous free area—is of $\leq 0.008$ mm$^2$, preferably $\leq 0.006$ mm$^2$, preferably $\leq 0.004$ mm$^2$, most preferably $\leq 0.002$ mm$^2$ per crossing point. With the described design, some or all of the remaining free areas in the sieve layer formed by the mesh material become so small that the sieve is sufficiently impermeable in its transversal direction.

The remaining free areas are thus defined as the respective continuous area, which when considering the sieve area along the middle of a mesh thread is not intersected or covered by a mesh thread. The remaining free areas are present on both sides of a thread at each crossing point. It can also be referred to as remaining transversal free area.

The metallic flat gasket according to the invention provides for a metallic flat gasket which allows for the intended passage of fluids through the filter area. At the same time, the transversal impermeability of the mesh material outside of these filter areas is sufficient in order to prevent fluid from permeating through the mesh material from one passage opening to another, vicinal passage opening.

According to the invention, it is especially advantageous if the metallic layers arranged adjacent to the mesh layer comprise a sealing bead which encircles at least one of the passage openings at least in sections. Such a sealing bead further improves the transversal impermeability.

It is also advantageous if the metallic layers arranged adjacent to the mesh layer on their surface facing the mesh layer are coated at least in sections. Elastomers, such as fluoropolymers, e.g. FKM (e.g. vinylidene-fluoride-hexafluoropropylene copolymer) are particularly suited for such coatings. Other suitable coating materials are silicone rubber, NBR rubber (acryl-butadiene rubber), HNBR (hydrated acryl-butadiene rubber), PUR (polyurethane), NR (natural rubber), FFKM (perfluoro rubber), SBR (stryrene-butadiene rubber), BR (butadiene rubber), IIR (butyl rubber), FVSQ (silicone rubber), CSM (chlorosulfonated polyethylene), as well as silicone or epoxide resins as such or in a mixture of at least of the materials mentioned. With this coating, the transversal impermeability is further increased as the remaining free areas of the mesh material are further sealed by the coating material, which enters into the interspaces between the treads.

With non-coated surfaces of the sealing layer arranged adjacent to the sieve layer, it is preferred if the sieve material is compressed to a larger degree, e.g. to more than 50%, preferably to more than 55%, while with coated surfaces of the sealing layers which coatings face the sieve layer, smaller degrees of compression are usually sufficient, e.g. between 30% and 50%—including the limits mentioned.

The two metallic layers, which are arranged adjacent to the mesh material, advantageously consist of stainless steel, spring steel, spring-hard steel or carbon steel. Such layers may comprise sealing beads as mentioned above, which sealing beads provide for an additional sealing in the direction of the plane of a gasket layer or parallel to this plane.

The threads of the mesh advantageously consist of metal, for example steel, e.g. austenitic steel, ferritic steel, stainless steel or carbon steel or they comprise these metals. If an austenitic steel is used for the initial mesh material, martensite formation during compression causes this material to become magnetic. This mesh material then can be used in the same way as a ferritic steel. It is thus possible to use a magnetic grab for such a compressed magnetic mesh material, which is a considerable advantage during production and handling. The thread diameter of the initial mesh material is usually between 0.04 and 0.12 mm.

As an alternative, the mesh threads can also consist of a thermoplastic or a thermoset material or comprise such. It is advantageous to use a polyester or a polyamide material.

It is advantageous to use a woven material as the thread material, in particular a woven material with a plain weave or with a twill weave. The mesh material may advantageously show a height of 10 µm to 1400 µm, preferably of 60 µm to 400 µm, and/or a width of the mesh of 80 µm to 250 µm, preferably 100 µm to 225 µm, preferably 100 µm to 200 µm. These magnitudes relate to the compressed material, which is reduced in its height.

If the mesh material is reduced in its thickness over its entire area, e.g. by compression, this allows for a particularly simplified production of metallic flat gaskets according to the invention. Such a completely compressed mesh material can be produced in an easy and cost-efficient manner from an initial mesh material, e.g. by calendaring. Both the weight per area and the partition remain essentially the same during compressing, with calendaring, the partition in the longitudinal direction may slightly increase.

During calendaring, only one line over the width of the material is compressed at a time, which means that calendaring requires considerable less pressure force is required than for a entire area compression of the mesh material. With an increasing degree of compression, the transversal spacings in the mesh material become smaller, which facilitates a sealing of the remaining free areas with a coating, e.g. with a coating of the adjacent metallic layers. The sieve layer itself remains uncoated.

Particularly high degrees of compression with remaining free areas of less than 0.004 mm$^2$ are possible without any damage to the mesh material if the material is calendared, intermediately annealed and again calendared. It is possible to anneal the mesh material once more at the end of the process.

From a production point of view, it is preferred to use a uniform piece of sieve material as the sieve layer. Some particular application may however require the use of mesh materials with different properties.

To this end, it is in principle possible to use a pair of graded calendar rolls or a pair of rolls each with a sequence of calendar rolls with different heights, these rolls being arranged one after another along the axis of each composed roll with the same sequence to be used for the upper and the lower composed roll. This allows to using a sieve layer with areas of different heights and therefore different magnitudes of the remaining free area. However, the zones run with a constant width which means that this variation of different mesh properties can only be used in particular applications.

As an alternative, it is possible, to combine different calendared materials in such a way to the sieve layer that this layer is composed of different pieces of different calendared material which are connected to each other either by adhesion or by form-locking. The connection needs to be performed in the plane of the sieve layer, thus without overlap and without any thickening. It is particularly preferred if laser welding is used for this connection.

The mesh width is generally selected depending of the size of particles of the particles to be filtered and the maximum admissible flow resistance. The initial material is selected from mesh materials with a ratio between mesh width and thread diameter of 2:1 to 4.5:1, preferably 7:5 to 9:2. With an increase of this ratio, compression of the mesh material becomes easier, but with a ratio higher than the maximum value specified above, the sealing beads usually used in metallic flat gaskets and the typical bolt forces would not suffice to achieve a sufficient sealing effect of the flat gasket.

To summarize, one can state that the mesh material according to the invention, especially when its entire area has been compressed, allows for a simplified and cost-efficient production of a flat gasket with filter areas. This flat gasket at the same time provides for a good passage of the fluids through the passage openings and a sufficient transversal impermeability. Together with the advantageous gasket, an advantageous method for the production of such a gasket is presented.

Apart from the mesh material layer and the top and bottom layers from relatively thin metal sheets, a distance layer which allows to adapting the thickness of the gasket, may be arranged between one of the top and bottom layers and the sieve layer, respectively. While the thickness of the bottom and top layer is usually between 0.1 and 0.25 mm, the thickness of the distance layer is at least 0.3 mm. The distance layer usually shows the same distribution of passage openings as the top and bottom layer, their magnitude may however be different.

In the following, some examples of a flat gasket according to the invention are explained in detail. Elements described for an individual example at the same time represent elements of the invention as such. In the following, identical or similar elements are referred to with identical or similar reference numbers. All multi-layer cross-sections show the gasket layers in an exploded representation relative to each other.

BRIEF DESCRIPTION OF THE DRAWINGS

It is shown in
FIG. 1: A gasket for a transmission control unit;
FIG. 6: A polished cut section of a mesh material;
and
FIG. 7: In two partial figures the ratio of the transverse leaking area to the compression of the material, for three different initial materials.

DETAILED DESCRIPTION OF THE INVENTION

Figure 1:
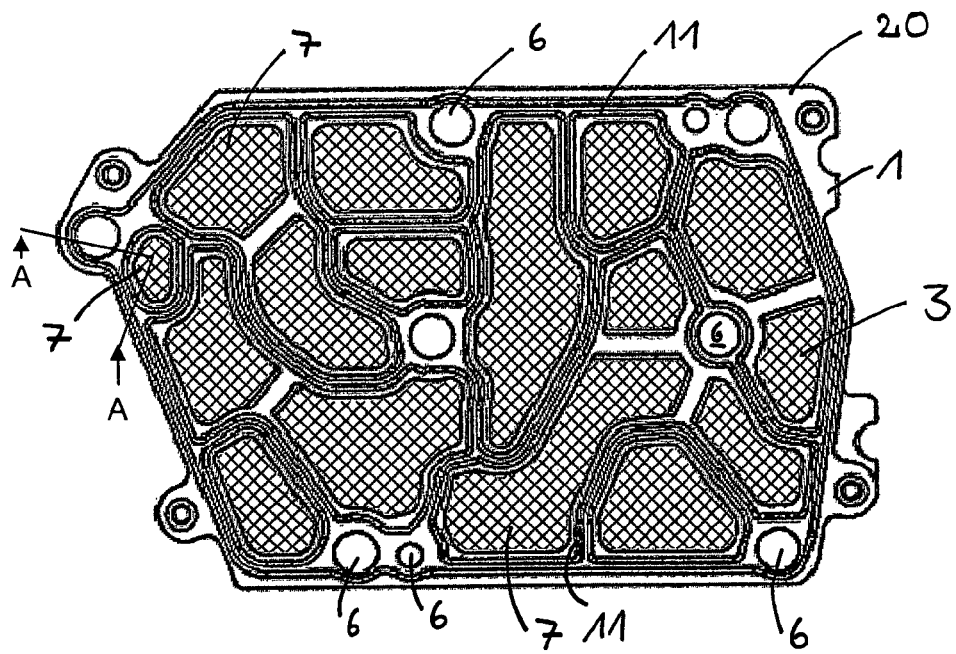

FIG. 1 shows a gasket, namely a gasket 20 for a transmission control unit, in a plan view. This plan view shows a first metallic layer 1 with a multitude of passage openings 6, 7, but where only some of the passage openings are explicitly marked with a reference number. The passage openings are openings for a passage through the transmission gasket 20, in a direction perpendicular to the plane of the drawing sheet. The passage openings 6 here are passage openings for bolts or the like; in these passage openings, no filter is arranged. The passage openings 7 are passage openings for fluids, e.g. for hydraulic oil. In these passage openings 7, a filter is arranged, which according to the invention is formed by a sieve layer 3 consisting of a mesh material. The sieve layer in FIG. 1 is referred to with reference number 3, only in the area of the passage openings 7, it is not covered by the gasket layer 1 and therefore only visible in this area.

Around the passage openings 7 and the bolt passage openings 6, sealing beads 11 are arranged in the first metallic layer 1. They form sealing lines around the circumferential edges of the passage openings 6 and 7 and as a consequence improve the transversal impermeability between these passage openings 6 and 7. The transversal impermeability is defined as the impermeability for the passage of fluids within the plane of the layer of the transmission gasket 20; it expresses the ability to seal against the permeation of fluids within the plane of the layer, namely the sieve layer, from a passage opening 6, 7 to another, vicinal passage opening 7, 6.

Figure 2:
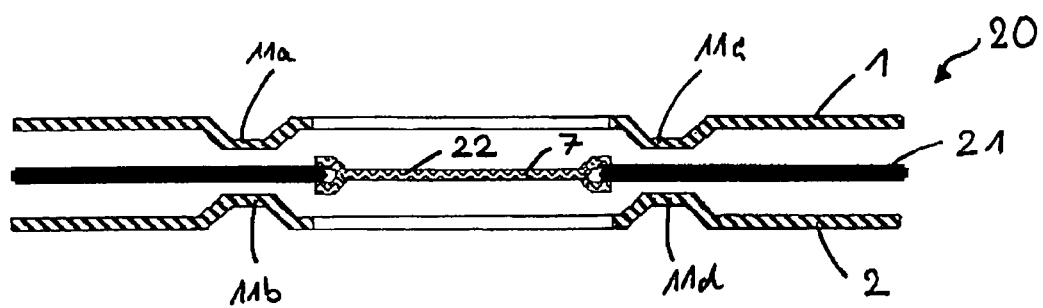
FIG. 2: A cross-section through a transmission gasket according to the state of the art.

FIG. 2 now shows in a cross-section the assembly of a transmission gasket 20 according to the state of the art. Such a transmission gasket comprises two metallic gasket layers 1 and 2, between which a further layer 21 is arranged. In the area of a passage opening 7, the intermediate layer 21 comprises an opening with a mesh sieve 22 being arranged in this passage opening. This mesh sieve 22 at its outer edge is connected to the layer 21, e.g. clipped. The mesh sieve 22 now forms a filter for a fluid, which passes through the mesh sieve 22 in a direction perpendicular to the plane of the mesh sieve. However, the production of such a gasket with a composed layer 21, 22 is extremely demanding.

Figure 3:
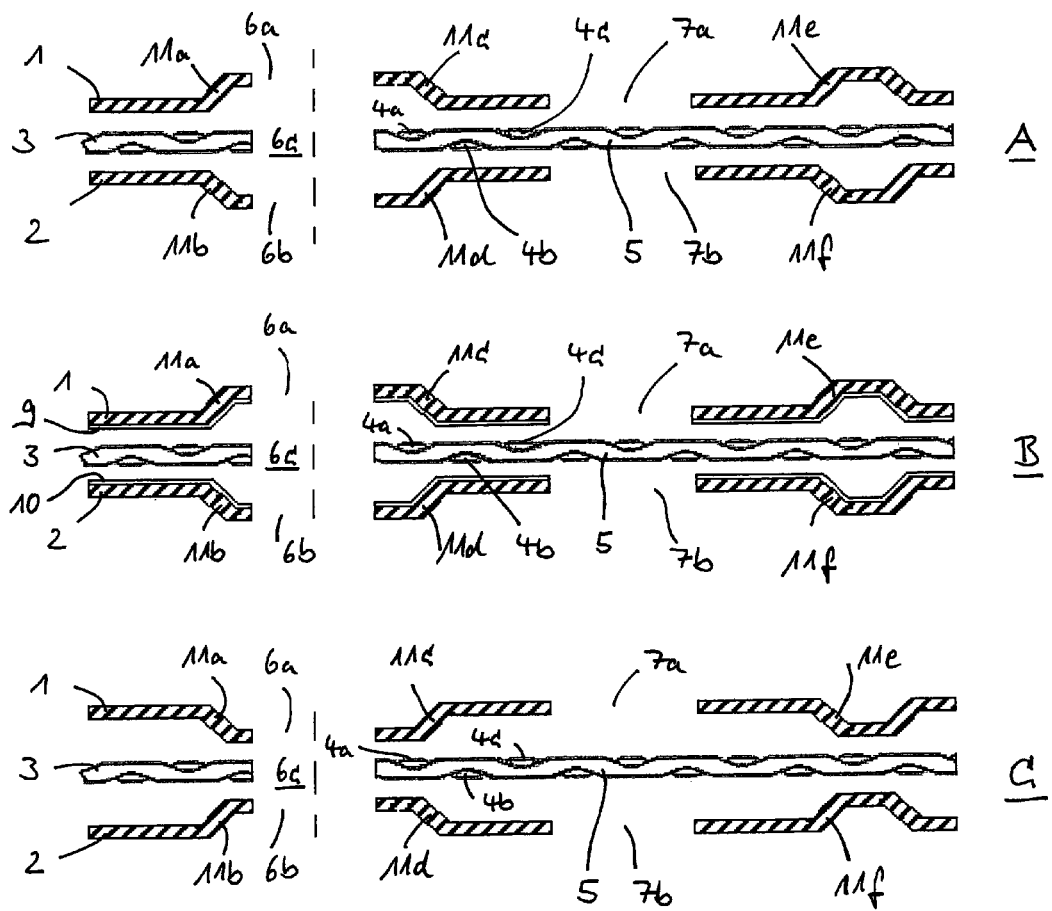
FIG. 3: Cross-sections through three transmission gasket as examples for flat gaskets according to the invention.

FIG. 3 therefore shows three embodiments of metallic flat gaskets according to the invention, for example transmission gaskets, comparable to FIG. 1. FIG. 3 shows three cross-sections which all correspond to line A-A in FIG. 1.

FIG. 3-A shows in a cross-section including passage openings 6 (6a, 6b, 6c) and passage openings 7 (7a, 7b, 7c) with the filter area. In the layers 1 and 2 made of spring steel, all these passage openings 6a, 6b, 6c and 7a, 7b, 7c are surrounded by elastic sealing beads 11a to 11f.

The central layer 3 according to the invention in its entirety consists of a woven mesh, which shows a degree of compression of more than 30%, thus a thickness which corresponds to less than 70% of its initial thickness. The woven mesh here is shown along the extension direction of a transversal thread 5 in a sectional view, so that the longitudinal threads 4a, 4b, 4c in turn are only shown as short sections in their cross section. Only some of the longitudinal threads in FIG. 3-A are referred to with an individual reference number.

The mesh material in the present example consists of metal threads, namely of a stainless steel of the type 1.4306 and is compressed over its entire area, thus over its complete width and its complete length by calendaring. Such a compression is particularly advantageous if it is accomplished with a calendar. A conventional press would require pressure forces which make a compression of the entire area with a degree of compression of more than 40% extremely laborious.

As already mentioned, the layer 3 mesh material spans the passage openings 7a, 7b and forms a filter area for fluid passing through these passage openings 7a, 7b, e.g. hydraulic oil. At the same time, the mesh material with such high degrees of compression is sufficiently impermeable in its transversal direction as to not allow hydraulic oil at all or in a quantity higher than admissible to pass from a passage opening 7a, 7b through the sieve layer 3, thus in the plane of the sieve layer 3 to the passage openings 6a, 6b, 6c.

In the passage openings 6a, 6b, 6c, no mesh material is arranged, as these openings, for example as bolt holes, do either not need or not allow a filter area.

As can be appreciated from FIGS. 1, 3A-C, 4A-B, 5A-B and 6, the mesh material comprises a weave of threads. The weave comprises at least a first set of threads all oriented in a first direction and a second set of threads all oriented in a second direction different than the first direction. The first direction may be transverse to the second direction. The threads of the first set are spaced from one another at regular intervals. The threads of the second set are spaced from one another at regular intervals.

In FIG. 3-B, a comparable embodiment as in FIG. 3-A is illustrated. In addition, both the gasket layers 1 and 2 on their surface facing the central layer 3 are covered with an elastomeric, FKM-based coating 9, 10 with a coating thickness of about 40 µM. This elastomeric coating seals interspaces which may exist in the sieve layer 3 in between individual threads 4a to 4c, 5. Advantageous coating thicknesses are between 20 µm and 50 µm. It is preferred that both surfaces of gasket layers which face to the mesh layer be coated. The sieve layer 3 itself is uncoated.

FIG. 3-C shows a further embodiment of a metallic flat gasket according to the invention. As a difference to the embodiment of FIG. 3-A, here, the direction of the sealing beads is inverted. They now do not point away from the sieve layer 3, but point towards the latter. This arrangement of the beads also allows for a good sealing in the transversal direction, thus in the plane of the layer and with respect to the permeation of a fluid from a passage openings 7a, 7b to the passage openings 6a, 6b, 6c.

Figure 4:
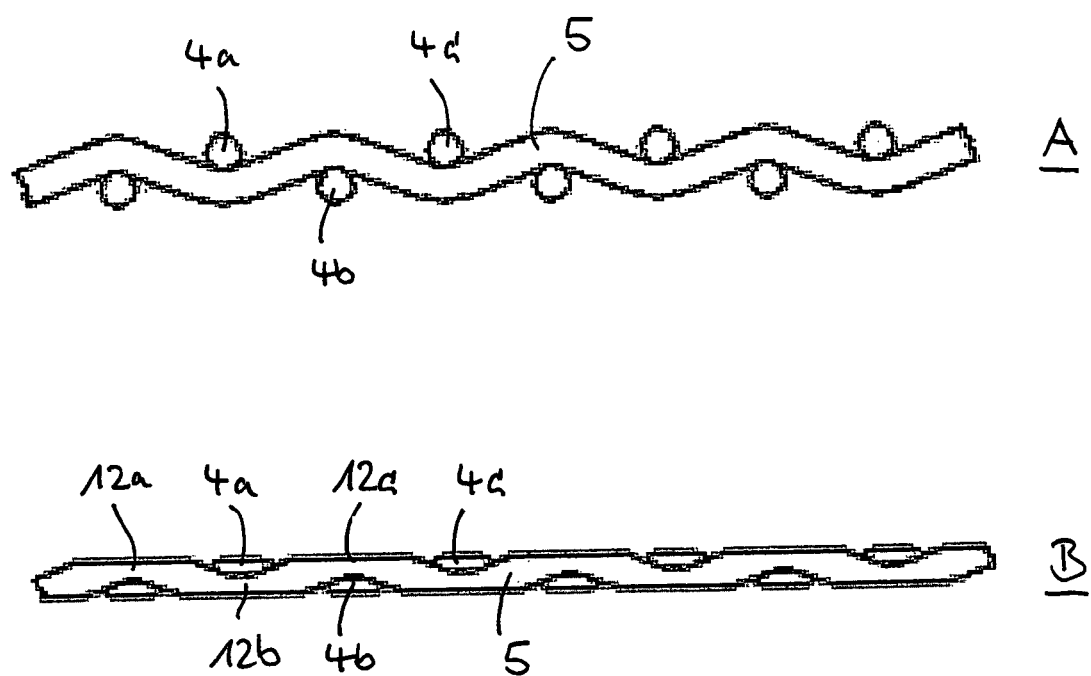
FIG. 4: Two cross-sections through mesh materials, once in the non-compressed and once in the compressed state, respectively.
Figure 5:
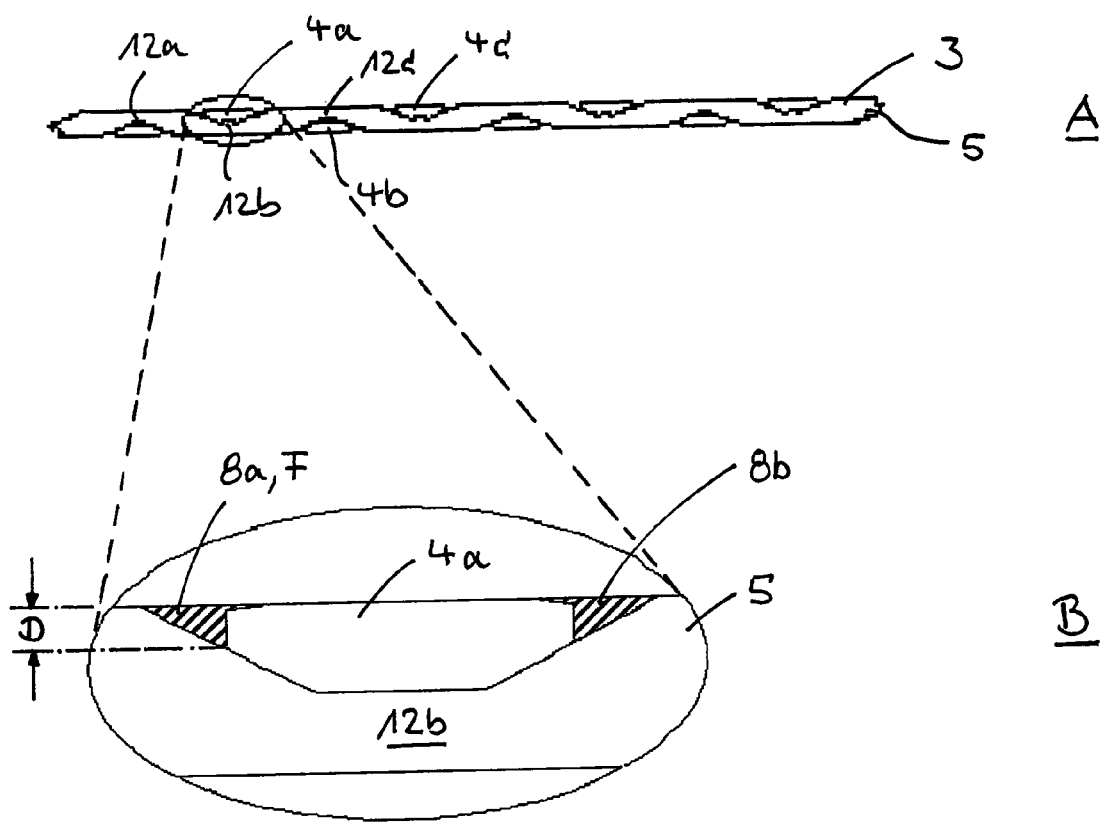
FIG. 5: A cross-section through a mesh material of a flat gasket according to the invention, corresponding to FIG. 4.

FIG. 4 in drawing 4-A shows a sectional view through a mesh material, with the cross section taken at the middle of a thread 5 and representing its longitudinal extension. The same material is shown drawing 4-B but now in a compressed state according to the invention. For this material, it is obvious, that at the crossing points, 12a, 12b, 12c, the total thickness of the two threads 4a, 5 crossing each (e.g. at the crossing point 12a) other is approximately the same than the thickness of the thread 5 between the two vicinal crossing points, e.g. between the two crossing points 12a and 12b or 12b and 12c. In FIG. 4-B, the mesh material is thus shown with a degree of compression of about 50%. The degree of compression compared to the initial material shown in FIG. 4-A is 50% as well. The distance between the threads 4a and 4c in both subfigures 4-A and 4-B corresponds to twice the partition of the weave. The width of a mesh in contrast corresponds to the distance between the right edge of thread 4a and a vertical projection of the left edge of thread 4b.

FIG. 5 in subfigure 5-A again shows the cross section through a mesh material, which has already been shown in FIG. 4-B. In addition, FIG. 5-B shows an increased section of crossing point 12b. It is obvious that remaining free areas 8a, 8b remain in the vicinity of the longitudinal thread 4a up to the area in which the transversal thread 5 reaches its full thickness. These remaining free areas in the cross section of the mesh material are not completely covered by threads 4a and 5. Such remaining free areas 8a, 8b allow fluid to permeate along the thread 4a also in the transversal direction, thus in the direction of the plane of the mesh material 3. With a sufficient reduction of these remaining free areas, the transversal permeability is extremely limited and thus the transversal impermeability becomes so good that the mesh material is not only suited as filter material in the passage openings 7a, 7b, but also as a sealing material in the areas between these passage openings. Based on this, it is sufficient to compress the mesh material 3 over its entire area in a uniform way and without providing any particular local structuring. While it is not possible to compress material with local structures in a calendar, it is possible to produce a uniformly compressed material with a calendar. This use of a calendar allows for a cost-efficient and simple production of compressed mesh material with the extremely high degree of compression required for the sealing purpose described.

FIG. 6 represents a polished cut section of a calendared mesh material of the steel type 1.4301, the cut has been performed in the middle of a thread 5. As a consequence of the situation of the cut, the threads 4a, 4b, . . . running perpendicularly to the cut thread 5 are visible as well as the crossing points 12a, 12b, . . . . The cut representation illustrates the conditions in a wire mesh, which has been compressed by about 55%, which has been calendared from a wire mesh with a wire thickness of 80 µm and a mesh width of 125 µm. The total thickness of the woven mesh H is at an average of the two positions marked with an arrow 74.5 µm and therefore 46.5% of the initial thickness. Analogously, the height of the individual threads HD with an average of 37.7 µm at the three positions marked is less than 50% of the thickness of the initial thread. The width B of the threads at the crossing points in the compressed sieve material therefore has changed considerably less, it amounts at an average of the two positions marked 106.4 µm and is thus ⅓ larger than the initial diameter of the thread. The ratio of width B to height HD of the compressed individual threads at the crossing points is between 2.7 and 2.8. It is obvious that only very small remaining free areas F are left between the threads 4a, 4b, 5 which cross with each other and the calendared woven mesh therefore shows a high transversal impermeability.

As tests involving hot oil are difficult and too dangerous to set up with standard size test specimens, suitability for practice of materials has been tested on few real examples at the test bench and under the conditions of a producer of automatic transmission units with testing conditions being secret know-how of this company. The decisive factors were whether the transmission unit did actuate an oil pump at the frequency to be expected under the test conditions and that only the correct switching operations took place. Tests were performed with the sieve layer being arranged between top and bottom layers 1, 2 made from beaded carbon steel DC 01 C 490 with a thickness of 0.250 mm.

The conditions set by the producer of the automatic transmission units were for instance achieved with a stainless steel 1.4301 sieve layer of 0.224 mm and 0.08 mm thread diameter at 55% percent of compression even though the top and bottom layers were not coated. With an FKM coating with a thickness of 40 μm on both surfaces of the layers 1, 2 a sieve layer with 0.125 mm mesh width and 0.08 mm thread diameter and a degree of compression of 30% did also fulfil the requirements. However, apart from the properties of the top and bottom layers, it is mainly the remaining free area which decides on whether a sieve material leads to the required impermeability.

FIG. 7 shows two diagrams which illustrate the magnitude of the remaining free areas 8a, 8b of the compressed mesh material once in $10^{-3}$ mm$^2$ (per remaining free area) and once as a relative value of the initial transverse leaking area for three different initial materials, all corresponding to the steel type 1.4301, which is rather similar to the 1.4306 type considered in the context of FIG. 3. Two materials have initial thread diameters of 0.08 mm but different initial mesh width, namely 0.224—indicated with diamond labels—and 0.125, marked with triangular labels. The measurement points with the circular labels relate to an initial material with a higher thread width of 0.09 mm and a mesh width of 0.200 mm.

Both partial FIGS. 7-A and 7-B at first sight show what is expected, namely that the remaining free areas become smaller with an increasing degree of compression of the mesh material. As follows from FIG. 7-A, at a degree of compression of 30%, the two materials with the smaller mesh width have transverse leaking areas which are less than 40% of the corresponding values of the initial sieve, the sieve material with 0.224 mm mesh width showing a slightly larger value. With 45% compression, the transverse leaking are is reduced to less than 10% of the initial value of all materials considered.

If one considers the absolute values in FIG. 7-B, the sieve material which in combination with coated top and bottom layers lead to the expected result shows a remaining transverse leaking area of 2.5 10 mm$^2$. Corresponding values are achieved with the material having 0.200 mm mesh width and 0.09 mm tread diameter at 40% of compression. A remaining transverse leaking area of less than 1 10$^{-3}$ mm$^2$ is obtained at 45% compression.

The invention claimed is:

1. A flat gasket comprising:
   at least a first metallic layer; and
   a second metallic layer; and
   a third layer arranged between the first and second metallic layer, with the first metallic layer comprising at least a first passage opening and the second metallic layer comprising at least a second passage opening, which are arranged adjacent to each other in a direction perpendicular to the planes of the layers, with the third layer adjacent to the first and second passage openings in a direction perpendicular to the planes of the layers showing no passage opening and spanning the passage openings in the plane of its layer, with the third layer as a sieve layer comprising a mesh material said mesh material comprising threads crossing each other while forming crossing points,
   wherein the mesh material in the area spanning the first and second passage openings in the plane of its layer and encircling these passage openings in the plane of its layer, the total height of two threads crossing each other at the middle of a crossing point of the two threads is less than 1.4 times the height of a single thread at half the distance between vicinal crossing points.

2. The flat gasket according to claim 1, wherein the mesh material in its entire area in the plane of the layer, for all crossing points, the total height of two threads crossing each other in the middle of the crossing point of the two threads is equal or less than 1.4 times the height of a single thread at half the distance between vicinal crossing points.

3. The flat gasket according to claim 1, wherein the mesh material in at least a first area shows a degree of compression compared to the initial, non-compressed mesh material composed of threads with essentially round diameter of greater than 30%.

4. The flat gasket according to claim 3, wherein the mesh material in at least a first area shows a degree of compression compared to the initial, non-compressed mesh material composed of threads with essentially round diameter of between 35% and at least 55%.

5. The flat gasket according to claim 1, wherein in at least a first area, two crossing threads at their crossing point show a ratio of width to height of between 1.5 and 4.

6. The flat gasket according to claim 5, wherein at least in the first area, two crossing threads at their crossing point show a ratio of width to height of between 2 and 3.

7. The flat gasket according to claim 1, wherein in at least a first area several or all remaining free areas in the cross section of the sieve layer along the middle of one mesh thread, several mesh threads or all of the mesh threads show an area of less than or equal to 0.008 mm$^2$ per crossing point.

8. The flat gasket according to claim 7, wherein at least in the first area several or all remaining free areas in the cross section of the sieve layer along the middle of one mesh thread, several mesh threads or all of the mesh threads show an area of less than or equal to 0.002 mm$^2$ per crossing point.

9. The flat gasket according to claim 1, wherein at least in a first area the mesh material has been calendar compressed.

10. The flat gasket according to claim 1, wherein the first layer, the second layer and the third layer each show at least one further passage opening, wherein the areas of the passage openings are arranged adjacent to each other in a direction perpendicular to the planes of the layers.

11. The flat gasket according to claim 1, wherein the first and/or the second layer around at least one of the passage openings at least in sections, comprises a sealing bead.

12. The flat gasket according to claim 1, wherein the first layer and/or the second layer at least on a surface of the first and/or second layer that face the sieve layer is coated with an elastomer.

13. The flat gasket according to claim 12, wherein said elastomer is selected from the group consisting of FKM (vinylidene-fluoride-hexafluoropropylene copolymer) silicone rubber, NBR rubber (acryl-butadiene rubber), PUR (polyurethane), NR (natural rubber), HNBR (hydrated natural rubber), FFKM (perfluoro rubber), SBR (stryrene-butadiene rubber), BR (butadiene rubber), IIR (butyl rubber), FVSQ (silicone rubber), CSM (chlorosulfonated polyethylene), silicone and epoxide resins.

14. The flat gasket according to claim 1, wherein the mesh threads are comprised of metal.

15. The flat gasket according to claim 14, wherein the metal comprises steel, austenitic steel, ferritic steel, stainless steel, and/or carbon steel.

16. The flat gasket according to claim 1, wherein the mesh threads are comprised of a thermoplast material or a thermoset material.

17. The flat gasket according to claim 16, wherein the thermoplast material is a polyamide and the thermoset material is a polyester.

18. The flat gasket according to claim 1, wherein the first layer and/or the second layer are comprised of stainless steel, spring steel, spring-hard steel or carbon steel.

19. The flat gasket according to claim 1, wherein the sieve layer is comprised of a single piece of uniformly compressed mesh material.

20. The flat gasket according to claim 1, wherein the sieve layer is comprised of a composition of at least two pieces with the pieces being connected to each other by at least one of an adhesive connection or a form-locking connection in the plane of the sieve layer.

21. The flat gasket according to claim 20, wherein the connection of the at least two pieces is achieved through laser welding.

22. The flat gasket according to claim 1, wherein the mesh material has a width of the mesh of 80 µm to 250 µm.

23. The flat gasket according to claim 22, wherein the mesh material has a width of the mesh of 100 µm to 200 µm.

24. The flat gasket according to claim 1, wherein the sieve material has a height of 10 µm to 1400 µm.

25. The flat gasket according to claim 24, wherein the sieve material has a height of 60 µm to 400 µm.

26. The flat gasket according to claim 1, wherein the mesh material is a woven material.

27. The flat gasket according to claim 26, wherein the mesh material has a plain weave or a twill weave.

28. The flat gasket according to claim 26, wherein said woven material comprises a first set of threads all oriented in a first direction and a second set of threads all oriented in a second direction different than the first direction.

29. The flat gasket according to claim 1, wherein said sieve layer is only woven mesh.

30. The flat gasket according to claim 29, wherein said sieve layer has compressed mesh areas that are impermeable within the plane of the mesh.

* * * * *